United States Patent

Hyman et al.

[11] 3,713,238
[45] Jan. 30, 1973

[54] POSTCARD INCLUDING PHOTOGRAPH MOUNTING MEANS

[76] Inventors: Herbert B. Hyman, 440 21st Place, Santa Monica, Calif. 90402; John R. Gramont, Jr., 883 Wellesley Avenue, Los Angeles, Calif. 90049

[22] Filed: Feb. 22, 1971

[21] Appl. No.: 117,233

[52] U.S. Cl. ................................................40/158
[51] Int. Cl. ................................................G09f 1/10
[58] Field of Search ..............40/158, 158 B, 125 A

[56] References Cited

UNITED STATES PATENTS

| | | | |
|---|---|---|---|
| 2,165,250 | 7/1939 | George | 40/158 R |
| 2,896,351 | 7/1959 | Johnson | 40/158 B |
| 2,936,540 | 5/1960 | Power | 40/158 R X |
| 3,304,641 | 2/1967 | Gonczy | 40/158 |

*Primary Examiner*—Robert W. Michell
*Assistant Examiner*—Wenceslao J. Contreras
*Attorney*—Franklin D. Jankosky

[57] ABSTRACT

A postcard, for securely mounting a photograph, which includes a well portion having photograph mounting means located therein. The sides of the well portion are of the approximate thickness of the photograph so as to protect the photograph during the cancellation process. The photograph mounting means includes a sheet of adhesive for retaining the photograph and a sheet of non-adhesive material, which may be perforated, to allow all or a portion thereof to be removed in order to mount the photograph on the postcard.

2 Claims, 7 Drawing Figures

PATENTED JAN 30 1973 3,713,238
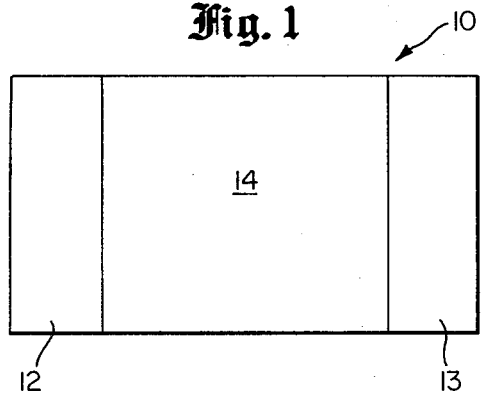
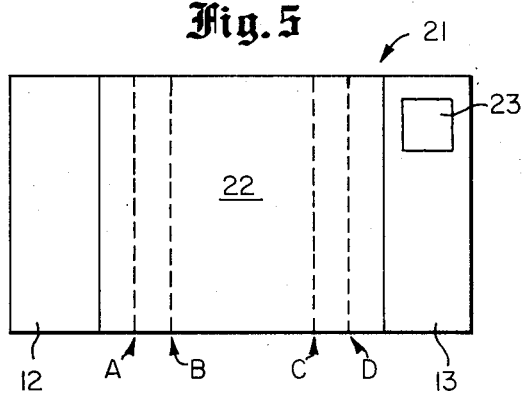
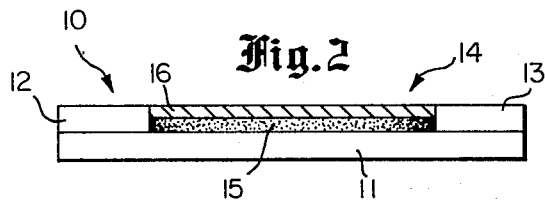
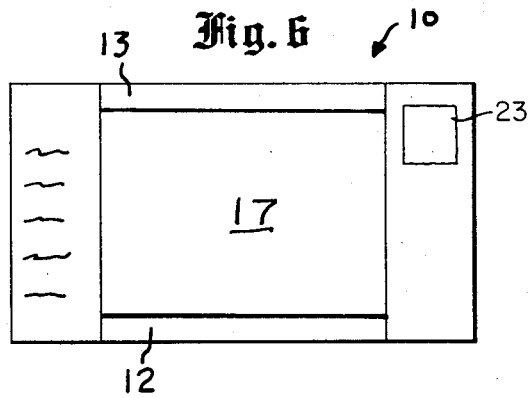
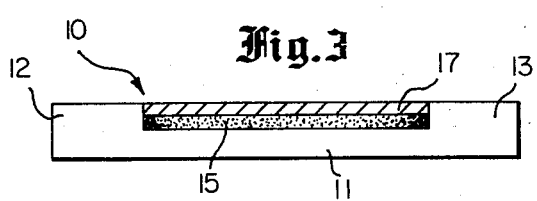
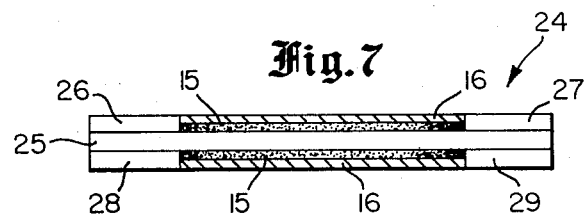
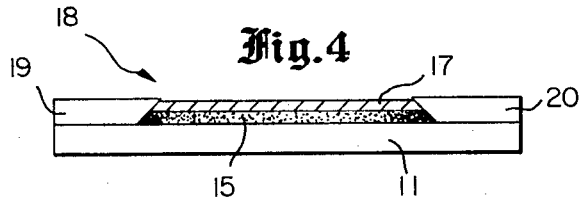
HERBERT B. HYMAN
JOHN R. GRAMONT, JR.
INVENTORS
BY Franklin D. Ankooky
ATTORNEY

POSTCARD INCLUDING PHOTOGRAPH MOUNTING MEANS

FIELD OF THE INVENTION

This invention relates to postcards and more particularly to a novel postcard to which a photograph or the like may be securely mounted.

DESCRIPTION OF THE PRIOR ART

Several prior art mailing devices have been devised to provide for the retention of a photograph on a postcard, for example, protruding adhesives have been mounted on a standard postcard to temporarily retain a photograph, a souvenir medal, or the like. A postcard having multiple overlapping foldable sheets of cardboard, with one sheet having a transparant sheet of plastic to allow a retained photograph to be visible has been constructed. While some of the previous mailing devices would retain the photograph in place, they were not totally acceptable to the public because the price of these mailing devices was usually too high because such complicated devices involved expensive manufacturing costs.

Accordingly, it is an object of the present invention to provide a novel postcard for securely mounting a photograph that is relatively inexpensive to manufacture.

It is a further object of the present invention to provide a novel postcard for securely mounting a photograph that protects the photograph during the manual or the automatic cancellation process of the postcard, or other mishandling.

It is a still further object of the present invention to provide a novel postcard for securely mounting photographs of various sizes on a postcard.

It is another object of the present invention to provide a novel postcard for securely mounting at least two photographs on the same postcard.

SUMMARY OF THE INVENTION

In accordance with the objects set forth above, the present invention provides a novel postcard for securely mounting a photograph thereon. One embodiment of the postcard includes a well portion having a photograph mounting means located therein, and sides of the well portion protect the photograph during the cancellation process or other mishandling. The photograph mounting means include a sheet of adhesive for retaining the photograph in the postcard and a sheet of non-adhesive material that is removed in order to allow the photograph to be mounted on the postcard.

Another embodiment of the postcard includes a perforated sheet of non-adhesive material to allow photographs of various sizes to be mounted on the postcard, while still another embodiment of the postcard includes two well portions, each having respective photograph mounting means to allow at least two photographs to be mounted on a single postcard.

BRIEF DESCRIPTION OF THE DRAWINGS

Additional objects, advantages, and characteristic features of the present invention will become readily apparent from the following detailed description of the preferred embodiments of the invention when taken in conjunction with the accompanying drawings in which:

FIG. 1 is a plan view of a postcard in accordance with the present invention;

FIG. 2 is a side elevational view of the postcard of FIG. 1 in accordance with the present invention;

FIG. 3 is a side elevational view of the postcard illustrating a photograph mounted thereon in accordance with the present invention;

FIG. 4 is a side view of a postcard, similar to the one illustrated in FIGS. 1 and 2, having modified protective members, in accordance with the present invention;

FIG. 5 is a plan view of a postcard having photograph mounting means which include multiple perforated sections in accordance with the present invention;

FIG. 6 is a plan view of a postcard illustrating a photograph mounted thereon in accordance with the present invention; and FIG. 7 is a side elevational view of a postcard having two well portions in accordance with the present invention.

DESCRIPTION OF THE PREFERRED EMBODIMENTS

Referring now to FIGS. 1 and 2, there are shown a plan view and a side elevational view, respectively, of a postcard 10 in accordance with the present invention. FIG. 2 and the other side elevational view are slightly enlarged in comparison to the plan views illustrated. The postcard 10 includes a substrate 11, members 12 and 13, and photograph mounting means 14. The substrate 11 and the members 12 and 13 may be of a suitable material such as, the types of cardboard that are conventionally used in the manufacture of postcards, or of a plastic material. The members 12 and 13 may be an integral part of the substrate 11, as shown in FIG. 3, or may be mounted to the substrate 11 by conventional means such as an adhesive, as shown in FIG. 2. The substrate 11 and the members 12 and 13 form a well portion to allow the photograph mounting means 14 to be located between such members 12 and 13. The photo mounting means 14 is comprised of a layer of adhesive 15 that is disposed on the central part of the substrate 11 and a sheet of non-adhesive type material 16, such as wax paper, as shown. The sheet of non-adhesive type material 16 need not necessarily be of the same thickness as the members 12 and 13.

Referring now to FIG. 3, there is shown a side elevational view of the postcard 10 having a photograph 17 mounted thereon in accordance with the present invention. The sheet of non-adhesive material 16 may be removed from the postcard 10 in order that the photograph 17, such as further illustrated in FIG. 5, may be mounted to and retained on the postcard 10 by means of the layer of adhesive 15. The members 12 and 13 provide additional protection to the photograph 17 during any automated cancellation process in a post office, or other mishandling, in that members 12 and 13 are approximately the same height as the photograph 17.

Referring now to FIG. 4, there is shown a plan view of another embodiment of a postcard 18 in accordance with the present invention. The postcard 18 is similar to the postcard 10 of FIG. 1, except that the photo mounting means 14 is mounted between members 19 and 20 that are beveled at respective angles, as shown. Such beveling of members 19 and 20 not only provides a well portion to align a photograph within the postcard 18, but provides the extra advantage of permitting the photograph 17 to be partially overlapped by the members 19 and 20 so that during any automatic cancellation process or mishandling, the photograph 17 will remain intact.

Referring now to FIG. 5, there is shown a plan view of still another embodiment of a postcard 21 in accordance with the present invention. The postcard 21 includes a substrate 11, as shown in early figures, and may include either the members 12 and 13 or the members 19 and 20, as respectively illustrated in FIGS. 2 and 4. However, the photo mounting means 13 of the instant embodiment includes a sheet of non-adhesive material 22 having a plurality of overlapping areas, as defined by the vertically aligned perforated lines or indentations designated A, B, C, and D. Such defined areas permit one to take off only a portion of the sheet of non-adhesive material 22 in order to mount various sized photographs on the postcard 21. It should be understood that even though the perforated lines A, B, C, and D are illustrated as vertical lines, such perforated lines may be either vertical, horizontal, or both. It should be further understood that even though a stamp 23 is illustrated on the upper right hand corner of FIG. 5, the stamp 23 may be on the reverse side of the various postcards illustrated and that the respective exposed surfaces of substrate 11 and the members 12, 13, 19 and 20 may be of a suitable material to provide a writing surface, as illustrated.

Referring now to FIG. 6, there is shown a plan view of a postcard 10 having a pair of horizontal members 12 and 13. The horizontal members 12 and 13 may be constructed of the same material as the previously shown vertical members 12 and 13 of FIG. 2 and may be mounted to substrate 11 to form a picture-frame construction for mounting the photograph 17.

Referring now to FIG. 7, there is shown a side elevational view of a postcard 24 in accordance with the present invention. The postcard 24 includes a substrate 25 having members 26, 27, 28 and 29 mounted thereon and a pair of photograph mounting means 14a and 14b. Thus, a pair of photographs, similar to the photograph 17, may be mounted on the postcard 24. The substrate 25, as well as the members 26, 27, 28 and 29, may be of similar material as the earlier discussed substrate 11 and members 12, 13, 18 and 19. It should be understood that, as in the case of the earlier discussed postcards, the members 26, 27, 28 and 29 may be an integral part of the substrate 25, or may be mounted to the substrate 25 by conventional adhesive means. It should be further understood that while the respective wells between the members 12 and 13 and the members 19 and 20 are illustrated as being centrally located between such members, one of the members may be smaller in width than its counterpart so as to offset a well from the center line of the postcard.

Thus, although the present invention has been shown and described with reference to particular embodiments, for example, photograph mounting means including a non-adhesive member having perforations, variations and modifications obvious to a person skilled in the art to which the invention pertains, for example, photograph mounting means including a plurality of separate non-adhesive members, are deemed to be within the spirit, scope and contemplation of the invention as set forth in the appended claims.

What is claimed is:

1. A mailing device comprising:
   first means having at least one recessed area for mounting a photograph, said first means includes beveled means to form said recessed area for partial overlapping of a mounted photograph by said first means for ensuring the protection of said mounted photograph during the cancellation process of said mailing device; and
   second means located within said recessed area adapted for retaining a photograph, said second means including adhesive means and non-adhesive means, said adhesive means being located between said first means and said non-adhesive means, said non-adhesive means for protecting the adhesive characteristics of said adhesive means, and said adhesive means for retaining a photograph on said first means subsequent to the removal of said non-adhesive means.

2. A mailing device as recited in claim 1 wherein said first means includes respective recessed areas for mounting respective photographs on opposite sides of said first means, each respective recessed area having respective second means located therein.

\* \* \* \* \*